(12) United States Patent
Krist et al.

(10) Patent No.: US 9,957,367 B2
(45) Date of Patent: May 1, 2018

(54) FOAMED CAPS AND CLOSURE SEAL COMPRISING POLYETHYLENE FOAM

(71) Applicants: SAUDI BASIC INDUSTRIES CORPORATION, Riyadh (SA); SABIC GLOBAL TECHNOLOGIES B.V., Bergen op Zoom (NL)

(72) Inventors: Johan Maria Krist, Kerkrade (NL); Emanuel Joseph Herman Marie Van der Ven, Tilburg (NL); Douwe Wiebe van der Meer, Maastricht (NL)

(73) Assignees: SAUDI BASIC INDUSTRIES CORPORATION, Riyadh (SA); SABIC GLOBAL TECHNOLOGIES B.V., Bergen op Zoom (NL)

(*) Notice: Subject to any disclaimer, the term of this patent is extended or adjusted under 35 U.S.C. 154(b) by 62 days.

(21) Appl. No.: 14/908,134

(22) PCT Filed: Jul. 7, 2014

(86) PCT No.: PCT/EP2014/064442
§ 371 (c)(1),
(2) Date: Jan. 28, 2016

(87) PCT Pub. No.: WO2015/014571
PCT Pub. Date: Feb. 5, 2015

(65) Prior Publication Data
US 2016/0177045 A1   Jun. 23, 2016

(30) Foreign Application Priority Data
Jul. 31, 2013 (EP) .................... 13178729

(51) Int. Cl.
| | | |
|---|---|---|
| C08J 9/12 | (2006.01) | |
| B65D 53/06 | (2006.01) | |
| C08J 9/14 | (2006.01) | |
| C08L 23/08 | (2006.01) | |
| B65D 51/00 | (2006.01) | |
| B65D 53/04 | (2006.01) | |

(52) U.S. Cl.
CPC .............. *C08J 9/122* (2013.01); *B65D 51/00* (2013.01); *B65D 53/04* (2013.01); *B65D 53/06* (2013.01); *C08J 9/141* (2013.01); *C08L 23/08* (2013.01); *C08J 2203/06* (2013.01); *C08J 2203/14* (2013.01); *C08J 2205/044* (2013.01); *C08J 2323/08* (2013.01)

(58) Field of Classification Search
CPC ........ B65D 51/00; B65D 53/04; B65D 53/06; C08J 9/122; C08J 9/141; C08J 2203/06; C08J 2203/14; C08J 2205/044; C08J 2323/08; C08L 23/08
See application file for complete search history.

(56) References Cited

U.S. PATENT DOCUMENTS

| | | | | |
|---|---|---|---|---|
| 5,904,965 A | * | 5/1999 | Noel | .......................... B32B 5/32 215/355 |
| 7,820,776 B2 | * | 10/2010 | Neuteboom | .......... C08F 210/02 526/323.2 |
| 2010/0009162 A1 | | 1/2010 | Rothweiler | |
| 2012/0111758 A1 | | 5/2012 | Lo | |
| 2013/0118924 A1 | | 5/2013 | Vidal et al. | |

FOREIGN PATENT DOCUMENTS

| | | | |
|---|---|---|---|
| EP | 2347969 | * | 7/2011 |
| EP | 2347969 A1 | | 7/2011 |
| WO | 2006094723 A1 | | 9/2006 |
| WO | WO2008/000673 | * | 1/2008 |

OTHER PUBLICATIONS

International Search Report for International Application No. PCT/EP2014064442; International Filing Date: Jul. 7, 2014; dated Oct. 7, 2014; 4 Pages.
Maria Pocas et al., "Measurement of oxygen transmission rate through foamed materials for bottle closures" Packing Technology and Science 2010; 23; 27-33.
Written Opinion of the International Searching Authority for International Application No. PCT/EP2014/064442; International Filing Date: Jul. 7, 2014; dated Oct. 7, 2014; 6 Pages.

* cited by examiner

*Primary Examiner* — Irina S Zemel
(74) *Attorney, Agent, or Firm* — Cantor Colburn LLP

(57) ABSTRACT

The invention is directed to foamed caps and closure seals comprising as one of the layers polyethylene foam. The polyethylene foam is obtained by foaming of low density polyethylene copolymer obtained by a high pressure polymerization process in the presence of 1,4-butanediol dimethacrylate.

16 Claims, 5 Drawing Sheets

Figure 1A:
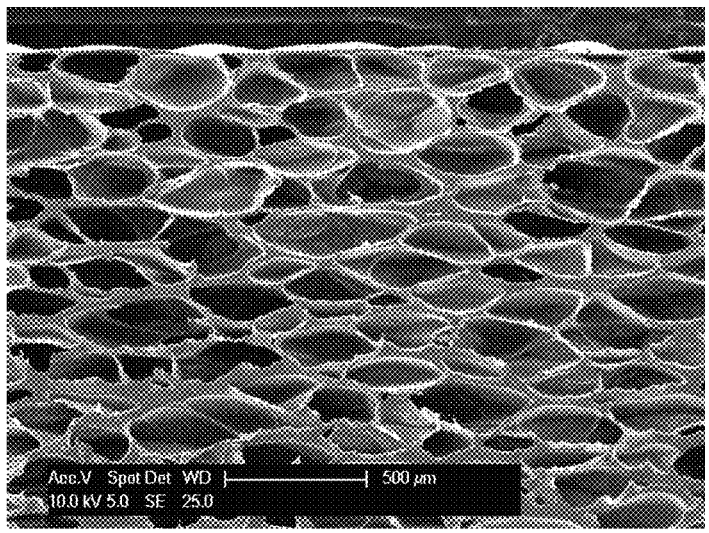

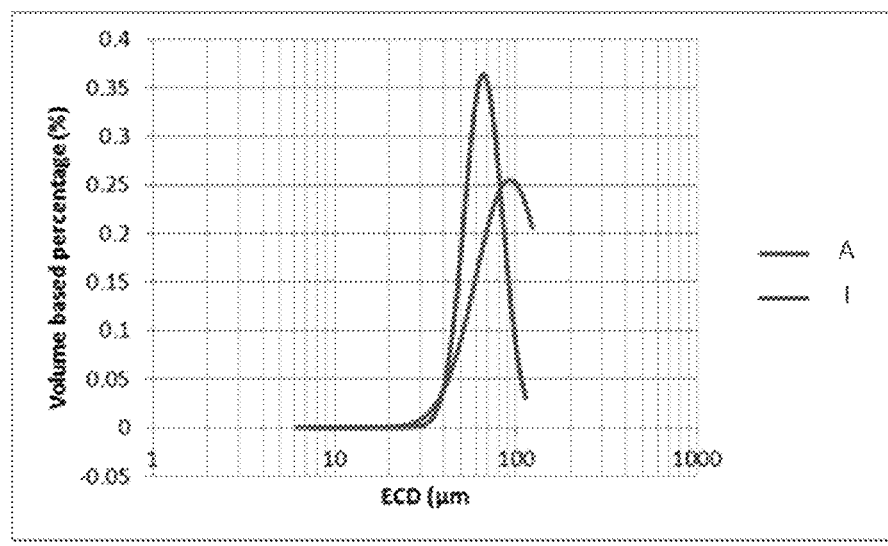
FIG. 5  Cell size distribution.

FOAMED CAPS AND CLOSURE SEAL COMPRISING POLYETHYLENE FOAM

CROSS REFERENCE TO RELATED APPLICATIONS

This application is a 371 of International Application No. PCT/EP2014/064442, filed Jul. 7, 2014, which claims priority to European Application No. 13178729.3, filed Jul. 31, 2013 which are incorporated herein by reference in their entirety.

The present invention relates to foamed caps and closure seals comprising polyethylene foam.

Foamed caps and closure seals are disclosed in WO 2008/000673 and US 2012/0111758. Foamed caps and closure seals may comprise several layers such as for example a foam core of low density polyethylene (LDPE) and an outer layer of a solid elastomer or a solid metal.

As disclosed by Maria Pocas et al, "Measurement of oxygen transmission rate through foamed materials for bottle closures" (Packaging Technology and Science 2010; 23; 27-33) oxygen plays a crucial role in wine properties at all stages of production and storage of all styles of wine. The effects of exposure can be both positive and negative, depending on the style of wine in question, the phase of production at which the oxygen exposure occurs and the amount of oxygen introduced, together with the rate of introduction. In the case of finished, packaged, still-wine, it is recognized that wine quality is generally diminished by excessive oxygen exposure,' but slow and continuous oxygenation may be beneficial for wine aging.' In the case of wine packaged in glass bottles, oxygen ingress depends on the sealing effectiveness of the closure.

Cork stoppers have been used for many years and still are preferred bottle closure for high-value wines. A range of synthetic closures is currently commercially available, produced in different plastics by either injection or extrusion (single or co-extrusion) processes. Synthetic closures are generally referred as offering a lower barrier to oxygen ingress, and although clear improvements have been achieved, recent wine closure surveys still reflect this idea.

The screw cap represents a distinct closure system. Normally made in aluminium, the screw cap has a liner that provides an airtight seals around the bottle rim. The liner may be composed of for example a polyvinylidene chloride film (which is the surface in contact with the wine), a layer of tin or aluminium foil and a polyethylene foam layer. The screw cap is generally considered the closure that offers the greatest barrier to oxygen. The sealing effectiveness of the closure system is a function of both the permeability of the material of the closure and of the tightness/adherence of the closure to the bottle wall. This latter consideration may affect, depending on the type of closure, the possibility of oxygen ingress through the interface between the closure and the glass. For both corks and synthetic stoppers, in addition to the nature of the material itself, the ratio between the diameters of the closure and the bottle neck and the nature of the closure surface are obvious factors in determining the barrier to oxygen ingress which the whole system represents. Storage position, upright or horizontal, is another variable that can influence oxygen ingress rate into the bottle. Additionally, air trapped within the cork or foam cells can be a relevant source of oxygen that is transferred into the head-space during storage.

Besides the application of foamed caps and closures seals in wine closures (artificial corks and screw caps) foamed caps and closures seals are also applied for example in contact with oil, chemical and food (for example choco pasta, peanut butter and coffee).

It is the object of the present invention to improve the oxygen transmission rate values through the closure system into the bottle.

The invention is characterised in that the foamed caps and closure seals comprise as one of the layers polyethylene foam obtained by physically foaming of low density polyethylene copolymer obtained by a high pressure polymerisation process in the presence of 1,4-butanediol dimethacrylate as co monomer.

According to a preferred embodiment of the invention the low density polyethylene copolymer obtained by a high pressure polymerisation process in the presence of 1,4-butanediol dimethacrylate has a density between 910 kg/m$^3$ and 935 kg/m$^3$ (according to ISO 1183) and a melt index between 0.10 and 100 dg/minute (according to ASTM D1133).

The high pressure polymerisation process may be an autoclave polymerisation process or a tubular polymerisation process.

According to a further preferred embodiment of the invention the high pressure polymerisation process is a tubular polymerisation process.

The low density polyethylene may be obtained by a polymerisation process as disclosed in WO2006/094723.

According to another preferred embodiment of the invention the foam is obtained by physically foaming of low density polyethylene.

According to a preferred embodiment of the invention the foamed caps and closure seal comprises as one of the layers polyethylene foam with a foam structure wherein more than 50% of the cells have a cell diameter smaller than 70 micrometers and wherein more than 95% of the cells have a cell diameter smaller than 150 micrometers.

It is an advantage of the present invention that that the obtained foam has a fine cell structure, a cell size in the range between 30 and 100 micrometers ($d_{50}$ is 66 µm), a homogeneous structure and a low oxygen transmission rate value.

It is a further advantage of the present invention that the foam has a smooth surface and furthermore the foam has no corrugation waves which results in a good adhesion between the different layers.

The present invention improves the quality of the foamed caps and closure seal.

The physical foaming process is a continuous extrusion process in which the blowing gas, which forms cells in the polyethylene (PE) melt, is injected directly into the PE melt and homogeneously mixed and dissolved in the molten polyethylene. In order to keep the gas dissolved in the PE melt, a minimum pressure, which is dependent on the gas used and the prevailing melt temperature, is needed in the molten polyethylene. A nucleating agent is distributed homogeneously. The nucleating agent may be an organic or an inorganic nucleating agent.

Generally the physically blown polyethylene foam has a highly regular, fine cellular foam structure with the cells having a cell diameter smaller than 550 micrometers.

Preferably the obtained fine cellular foam may consist essentially of closed cells (with at least 90% of the cells being closed). The obtained foam may also be partly open cell foam with an open cell content of for example 10%-90% of all cells. Examples of inorganic nucleating agents are for example talc, silicium oxide, titanium oxide and aluminum trihytate.

For the desired organic nucleating performance the crystallization temperature of the nucleating agent must be higher than that of polyethylene so that, as the polyethylene melt cools down, the nucleating agent crystallizes sooner than polyethylene. The difference between the crystallization temperatures of polyethylene and the nucleating agent may be greater than 10° C. As a result, the nucleating agent will have crystallized before the polyethylene changes to the solid phase at its crystallization temperature. The crystallization temperature can be determined by DSC measurement (ASTM D3417-97).

Suitable organic nucleating agents include an amide, an amine and/or an ester of a saturated or unsaturated aliphatic ($C_{10}$-$C_{34}$) carboxylic acid.

Examples of suitable amides include fatty acid (bis) amides such as for example stearamide, caproamide, caprylamide, undecylamide, lauramide, myristamide, palmitamide, behenamide and arachidamide, hydroxystearamides and alkylenediyl-bis-alkanamides, preferably ($C_2$-$C_{32}$) alkylenediyl-bis-($C_2$-$C_{32}$) alkanamides, such as for example ethylene bistearamide, butylene bistearamide, hexamethylene bistearamide, and/or ethylene bibehenamide.

Suitable amines are for instance ($C_2$-$C_{18}$) alkylene diamines such as for example ethylene biscaproamine and hexamethylene biscaproamine.

Preferred esters of a saturated or unsaturated aliphatic ($C_{10}$-$C_{34}$) carboxylic acid are the esters of an aliphatic ($C_{16}$-$C_{24}$) carboxylic acid.

The nucleating agent may be applied in an amount of between 0.1 and 4.0 wt. relative to polyethylene. Preferably, this amount ranges between 0.5 and 1 wt. %.

The polyethylene foam has a density of between 10 and 600 kg/m$^3$.

The composition to be foamed contains at least the polymer, the nucleating agent, a blowing agent and a cell stabilizer. The composition may additionally contain other additives such as for example flame retardants, pigments, lubricants, antistatic agents, processing stabilizers, chemical blowing agents and/or UV stabilizers.

Suitable physical blowing agents include for example isobutane, $CO_2$, pentane, butane, nitrogen and/or fluorohydrocarbons. Preferably, the physical blowing agent is isobutane or $CO_2$.

Suitable cell stabilizers include for example glycerol monostearate (GMS), mixtures of GMS and glycerol monopalmitate (GMP) and/or amides such as for example stearyl stearamide and/or stearamide. Preferably, the cell stabiliser is GMS.

The composition is extruded at a temperature just above the crystallization temperature of the polyethylene. The exit temperature from the extrusion opening usually is maximum 10° C. and preferably maximum 5° C. higher than the crystallization temperature. The temperature at which the viscosity increase begins due to the crystallization of polyethylene corresponds with the crystallization onset temperature from a DSC curve. In order to achieve on the one hand the maximum viscosity and hence the desired fine cellular structure and, on the other, to prevent the melt from "freezing" (crystallizing too rapidly) in the outlet, the melt temperature is maintained at about 5° C. and preferably about 2° C. above the crystallization onset temperature so as to obtain the desired fine cellular foam. The cell diameter can be determined with for example a light microscope with image projection or with a Scanning Electron Microscope (SEM). The obtained foam exhibits a smooth surface structure. Surface roughness can be determined using a profilometer.

The foamed caps and closure seal according to the invention may comprise one foamed layer wherein the foamed layer is low density polyethylene (LDPE).

The foamed caps and closure seal according to the invention may comprise several layers such as a foamed support layer of low density polyethylene (LDPE) and layers of a non-foamed, solid polymeric material or a solid metal, called lamination films.

Lamination films can be present at one or both sides of the foamed support layer. In between the lamination film and support foam an adhesive or extrusion coated layer may be present.

The thickness of the foamed support layer can be between 0.5 mm and 4 mm, whereas the individual thickness of the other layers may be between 15 micrometers and 200 micrometers. The thickness of the adhesive or extrusion coated layer is usually small in comparison to the dimensions of other layers and is between 8 micrometers and 30 micrometers.

Suitable materials for the outer-layers are for example bi-oriented polypropylene (BOPP), bi-oriented polyester terephthalate (BOPET), ethylene vinyl alcohol and an aluminium layer and multilayer filmic structures comprising for example LDPE, LLDPE, HDPE and PP. Those film layers may be used as such (transparent or opaque) or may be printed possible combined with coated with an additional barrier material or slip material (silicones), or vacuum deposited with a metal like aluminium. The foamed support layer consists mainly of a low density polyethylene copolymer.

The outer layers are laminated to the foamed support layer after the production of the foamed support layer via heat or extrusion lamination process or with adhesives. This can be done in-line or in a second process step.

The complete seals, typically round shaped, are than removed from the sheet by die-cutting.

The invention will be elucidated by means of the following non-restrictive experiments and examples.

EXAMPLES

Production of Foamed Seal for Caps and Closures

Foamed seals for caps and closures were produced on a foam extruder (Aixfotec) using carbon dioxide as a blowing agent, LDPE as resin and 0.5% by weight relative to the total composition of Hydrocerol CF40 as nucleating agent.

The melt temperature on the extruder was 108 degrees Celsius. With the dosing of carbon dioxide a foam density of 170 kg/m$^3$ was obtained.

The applied LDPE resins:

LDPE resin I according to the invention (MFI 4.7; density 919 kg/m$^3$) obtained by high pressure tubular polymerisation process in the presence of 1,4-butanediol dimethacrylate as co monomer.

LDPE resin A (MFI 4.2; density 924 kg/m$^3$) obtained by high pressure tubular polymerisation process.

The above described process resulted in foamed seals:

Example I: foam with a density of 170 kg/m$^3$ and a thickness of 1 mm, produced with LDPE I.

Comparative Example A: foam with a density of 170 kg/m$^3$ and a thickness of 1 mm, produced with LDPE A.

The foamed seals were analyzed via microscopy:

Scanning electron microscopy (SEM) to investigate cell structure,

Surface optical microscopy to validate the surface of the foam using image analysis AnalySIS auto from Olympus, a profilometer Veeco Dektak 6M Stylus to determine surface roughness parameters, and OTR-measurements to determine the oxygen transmission rate.

Description of Analysis of Foamed Seals:

The samples for cross section analysis are cut out of the sheet (parallel to the length direction) using a razor blade, and fixed into a SEM sample holder.

The samples for surface analysis are also cut out of the sheet and fixed with double sided adhesive tape to a SEM sample holder. All samples are coated with a conductive gold layer (150 s, 30 mA). Imaging of the cross sections is done using a Philips CP SEM XL 30 at an acceleration voltage of 15 kV.

The samples for surface analysis are imaged with LM (reflected bright light) Leica MZFLIII.

The image analysis is done using AnalySIS auto from Olympus. For each image a number of steps (in various combinations) have been taken to enhance the desired features:

Resulting image contrast optimized and binarized.

Features are analysed and put in Excel files.

Conversion from 2D to 3D using Matlab tool.

The pictures of the analysis are listed as FIGS. 1A, 1B, 2A, and 2B.

FIGS. 1A, 1B, 2A, and 2B, are related to cell structure analysis.

FIG. 1A: Foam produced with LDPE I (scale 500 mu)
FIG. 1B: Foam produced with LDPE A (scale 500 mu)
FIG. 2A: Foam produced with LDPE I (scale 1 mm)
FIG. 2B: Foam produced with LDPE A (scale 1 mm)

Figure 3A:
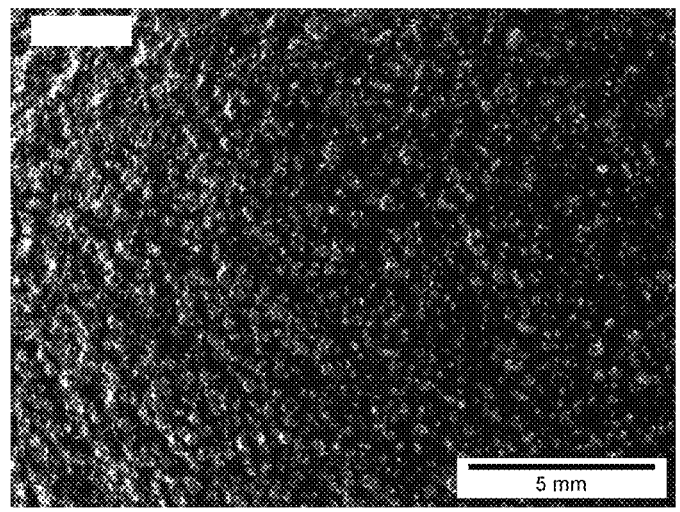
Figure 3B:
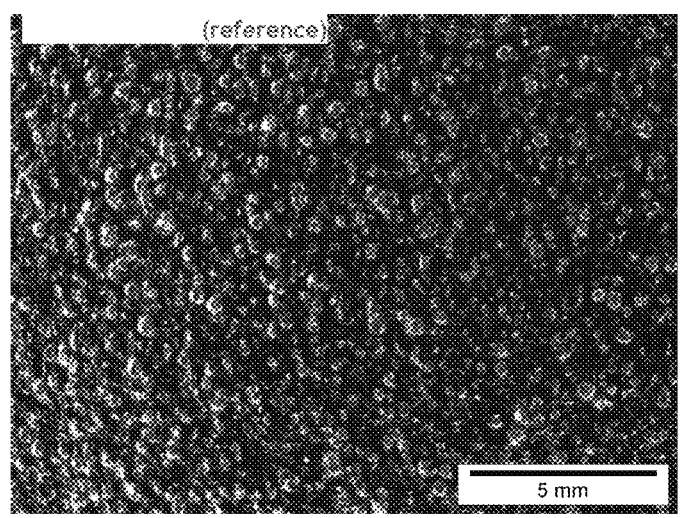
Figure 4A:
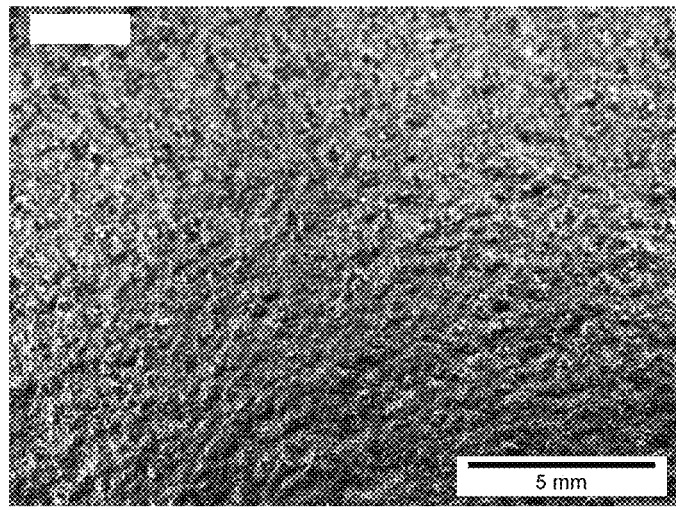
Figure 4B:
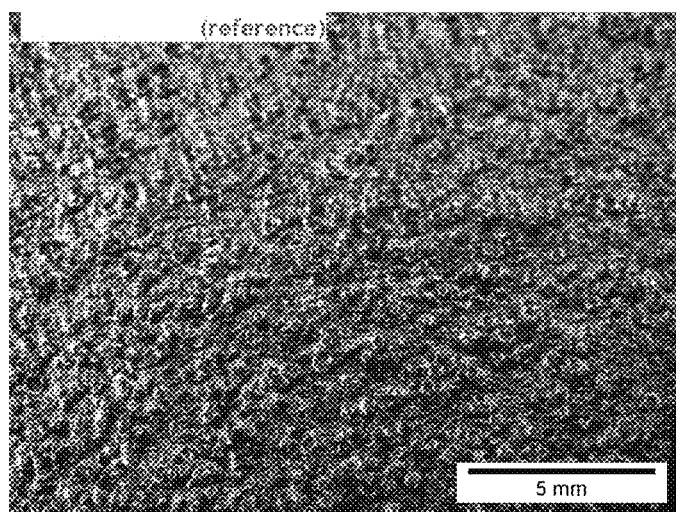

FIGS. 3A, 3B, 4A, and 4B, are related to surface structure analysis
FIG. 3A: Foam produced with LDPE I (scale 5 mm)
FIG. 3B: Foam produced with LDPE A (scale 5 mm)
FIG. 4A: Foam produced with LDPE I (scale 5 mm)
FIG. 4B: Foam produced with LDPE A (scale 5 mm)
FIG. 5: Cell size distribution of foam produced with LDPE I and A, respectively.

Figure 1B:
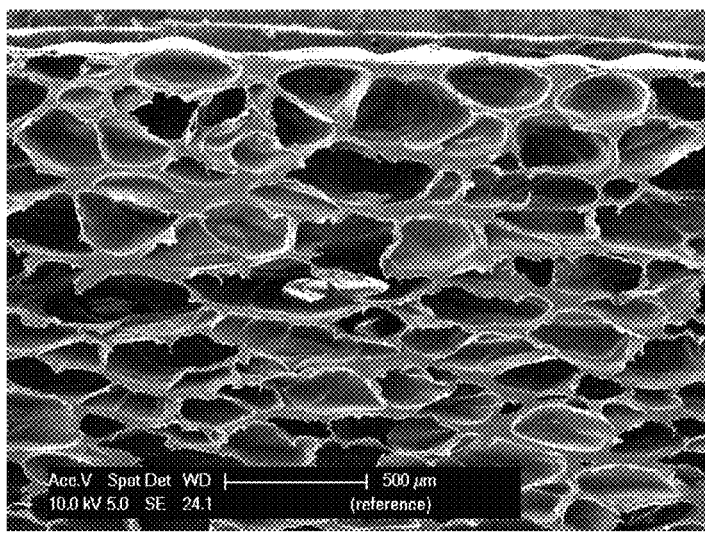
Figure 2A:
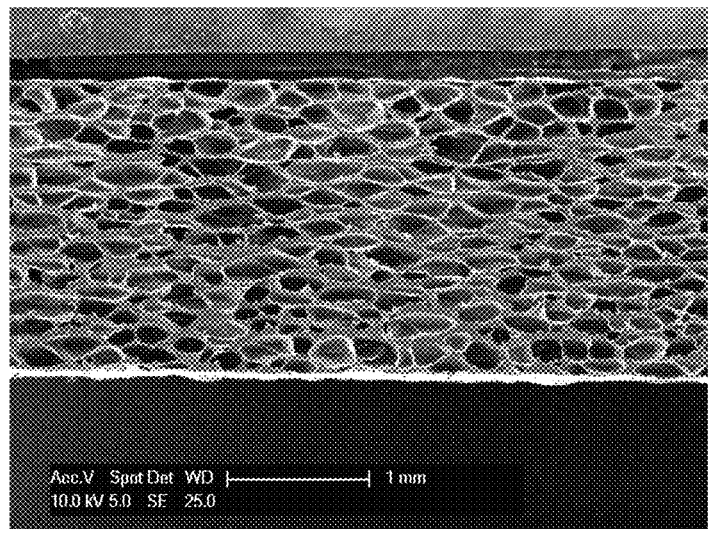
Figure 2B:
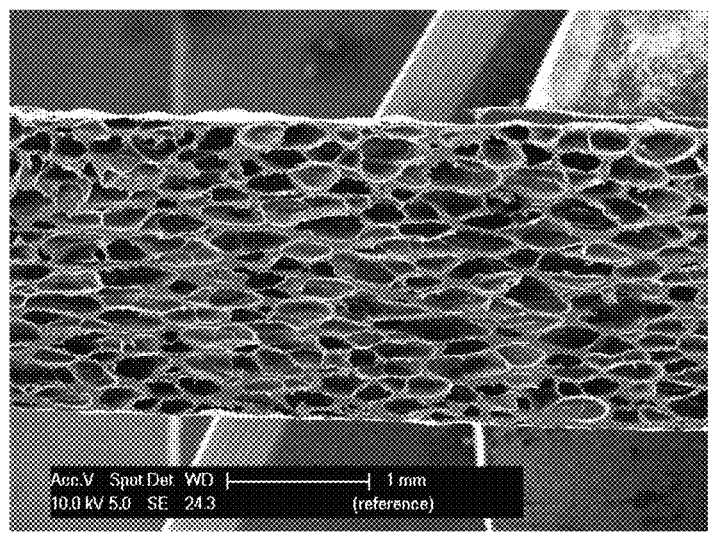

Table 1 contains the result of the digital analysis of the cell structure of the product of FIGS. 1A and 1B.

TABLE 1

| Description | Number of cells |
|---|---|
| FIG. 1A | 578 |
| FIG. 1B | 462 |

The cell size distribution is given in FIG. 5. Table 2 shows the derived numbers from the cell size distributions.

TABLE 2

| Sample | $d_{50}$ (μm) | Lower limit (μm) | Upper limit (μm) | Width (μm) |
|---|---|---|---|---|
| I | 66 | 64 | 68 | 25 |
| A | 93 | 85 | 101 | 70 |

The $d_{50}$ indicates the location of the peak of the distribution at which 50% of the cell sizes is smaller and 50% is larger in case of a symmetric distribution which is valid here. The $d_{50}$ of Sample A is about 30% smaller and the width is even a factor of three smaller. The cell sizes of Sample A are clearly smaller and exhibit a much narrower distribution.

Table 3 shows the measured oxygen transmission rates (OTR) of foam produced with LDPE I and LDPE A, respectively.

TABLE 3

| Sample | ($cm^3/m^2$ d bar) |
|---|---|
| I | 1315 |
| A | 2260 |

The OTR has been measured according to method ISO 15105-2/DIN 53380-3 at a temperature of 23° C. and a relative humidity of 75%.

The OTR of the foamed samples based on LDPE A is higher for all samples measured in comparison with the LDPE I according to the invention.

Table 4 shows the roughness parameters Ra and Rq of the foam produced with LDPE I and LDPE A, respectively.

TABLE 4

| Sample | Roughness Parameters (μm) | | Estimated Surface Height Distribution (μm) | |
|---|---|---|---|---|
| | Ra | Rq | Max | Min |
| I - Side A - X | 7.1 | 9.6 | 17.3 | −21.3 |
| I - Side A - Y | 8.1 | 11.0 | 16.0 | −38.3 |
| I - Side B - X | 7.4 | 9.8 | 38.7 | −26.0 |
| I - Side B - Y | 6.9 | 9.7 | 5.3 | −55.7 |
| A - Side A - X | 12.7 | 15.6 | 28.3 | −6.7 |
| A - Side A - Y | 11.3 | 14.4 | 12.7 | −20.7 |
| A - Side B - X | 8.9 | 12.8 | 16.0 | −24.3 |
| A - Side B - Y | 7.5 | 10.8 | 19.0 | −15.3 |

"X" and "Y" indicate perpendicular directions in which the roughness profiles were measured. Measurements were repeated on both surfaces, called "side A" and "Side B". Indicated are the maximum value and minimum values of the recorded roughness profile, as well.

The roughness of the foamed samples based on LDPE A is higher for all samples measured in comparison with the LDPE I according to the invention.

The invention claimed is:

1. Foamed caps and closure seal comprising as one of the layers polyethylene foam wherein the foam is obtained by foaming of low density polyethylene copolymer obtained by a high pressure polymerisation process in the presence of 1,4-butanediol dimethacrylate.

2. The foamed caps and closure seal according to claim 1 wherein low density polyethylene obtained by the high pressure polymerisation process in the presence of 1,4-butanediol dimethacrylate has a density between 910 kg/m³ and 935 kg/m³ (according to ISO 1183) and a melt index between 0.10 and 100 dg/minute (according to ASTM D1133).

3. The foamed caps and closure seal according to claim 1, wherein the high pressure polymerisation process is a tubular polymerisation process.

4. The foamed caps and closure seal according to claim 1, wherein the foam is obtained by physically foaming of low density polyethylene.

5. The foamed caps and closure seal according to claim 1, comprising as one of the layers polyethylene foam with a foam structure wherein more than 50% of the cells have a cell diameter smaller than 70 micrometers and wherein more than 95% of the cells have a cell diameter smaller than 150 micrometers.

6. The foamed caps and closure seal according to claim 2, wherein the high pressure polymerisation process is a tubular polymerisation process.

7. The foamed caps and closure seal according to claim 2, wherein the foam is obtained by physically foaming of low density polyethylene.

8. The foamed caps and closure seal according to claim 2, comprising as one of the layers polyethylene foam with a foam structure wherein more than 50% of the cells have a cell diameter smaller than 70 micrometers and wherein more than 95% of the cells have a cell diameter smaller than 150 micrometers.

9. The foamed caps and closure seal according to claim 3, comprising as one of the layers polyethylene foam with a foam structure wherein more than 50% of the cells have a cell diameter smaller than 70 micrometers and wherein more than 95% of the cells have a cell diameter smaller than 150 micrometers.

10. The foamed caps and closure seal according to claim 4, comprising as one of the layers polyethylene foam with a foam structure wherein more than 50% of the cells have a cell diameter smaller than 70 micrometers and wherein more than 95% of the cells have a cell diameter smaller than 150 micrometers.

11. The foamed caps and closure seal according to claim 1, wherein the foam consist essentially of closed cells.

12. The foamed caps and closure seal according to claim 1, wherein at least 90% of the cells are closed.

13. The foamed caps and closure seal according to claim 1, wherein the foam has an open cell content of 10% to 90% of all cells.

14. The foamed caps and closure seal according to claim 8, wherein the foam consist essentially of closed cells.

15. The foamed caps and closure seal according to claim 8, wherein at least 90% of the cells are closed.

16. The foamed caps and closure seal according to claim 8, wherein the foam has an open cell content of 10% to 90% of all cells.

\* \* \* \* \*